(12) United States Patent
Lee et al.

(10) Patent No.: US 9,275,024 B2
(45) Date of Patent: Mar. 1, 2016

(54) IDENTIFIERS FOR WEB FONT TEMPLATES

(75) Inventors: Steve Hsing Lee, San Jose, CA (US);
David S. Harned, III, East Dundee, IL (US); Venkat Yetrintala, Wood Dale, IL (US)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 13/278,740

(22) Filed: Oct. 21, 2011

(65) Prior Publication Data

US 2012/0102391 A1 Apr. 26, 2012

Related U.S. Application Data

(60) Provisional application No. 61/405,481, filed on Oct. 21, 2010.

(51) Int. Cl.
*G06F 17/00* (2006.01)
*G06F 17/22* (2006.01)
*G06F 17/24* (2006.01)

(52) U.S. Cl.
CPC ............ *G06F 17/227* (2013.01); *G06F 17/248* (2013.01)

(58) Field of Classification Search
CPC . G06F 17/248; G06F 17/218; G06F 17/2725; G06F 17/227
USPC .......................................... 715/235, 236, 243
See application file for complete search history.

(56) References Cited

U.S. PATENT DOCUMENTS

| | | | | |
|---|---|---|---|---|
| 5,860,073 A * | 1/1999 | Ferrel et al. | | 715/255 |
| 6,463,440 B1 * | 10/2002 | Hind et al. | | 715/235 |
| 6,792,577 B1 * | 9/2004 | Kimoto | | 715/235 |
| 6,865,593 B1 * | 3/2005 | Reshef et al. | | 709/203 |
| 6,970,859 B1 * | 11/2005 | Brechner et al. | | 1/1 |
| 7,080,083 B2 * | 7/2006 | Kim et al. | | 715/236 |
| 7,134,073 B1 * | 11/2006 | Fiedorowicz et al. | | 715/235 |
| 7,581,173 B1 * | 8/2009 | Ferguson et al. | | 715/235 |
| 7,620,903 B1 * | 11/2009 | Rasmussen et al. | | 715/762 |
| 7,917,396 B1 * | 3/2011 | Drake et al. | | 725/106 |
| 8,181,107 B2 * | 5/2012 | Melnyk et al. | | 715/238 |
| 8,276,118 B2 * | 9/2012 | Chapman et al. | | 717/113 |
| 8,799,767 B2 * | 8/2014 | Craw et al. | | 715/234 |
| 2003/0217076 A1 * | 11/2003 | Heptinstall et al. | | 707/104.1 |
| 2004/0103371 A1 | 5/2004 | Chen et al. | | |
| 2004/0111673 A1 * | 6/2004 | Bowman et al. | | 715/513 |
| 2004/0133855 A1 * | 7/2004 | Blair et al. | | 715/517 |
| 2004/0205613 A1 * | 10/2004 | Li et al. | | 715/523 |
| 2005/0055635 A1 * | 3/2005 | Bargeron et al. | | 715/525 |
| 2006/0136309 A1 * | 6/2006 | Horn et al. | | 705/26 |
| 2006/0161841 A1 * | 7/2006 | Horiuchi | | G06F 17/248 715/234 |
| 2007/0011146 A1 * | 1/2007 | Holbrook | | 707/3 |

(Continued)

FOREIGN PATENT DOCUMENTS

JP 2006/163536 1/2006

OTHER PUBLICATIONS

International Search Report & Written Opinion, PCT/US2011/057286, dated Dec. 22, 2011, 9 pages.

(Continued)

*Primary Examiner* — Laurie Ries
(74) *Attorney, Agent, or Firm* — Fish & Richardson P.C.

(57) ABSTRACT

A computer-implemented method includes producing a unique identifier, and, assigning the unique identifier to a style sheet for web asset production.

14 Claims, 4 Drawing Sheets

(56) References Cited

U.S. PATENT DOCUMENTS

| | | | |
|---|---|---|---|
| 2007/0094156 A1* | 4/2007 | Isaacs | 706/2 |
| 2007/0157320 A1* | 7/2007 | Collins et al. | 726/27 |
| 2007/0192422 A1* | 8/2007 | Stark et al. | 709/206 |
| 2007/0204013 A1* | 8/2007 | Castrucci | 709/219 |
| 2007/0204211 A1* | 8/2007 | Paxson | 715/501.1 |
| 2007/0250769 A1* | 10/2007 | Bass et al. | 715/523 |
| 2008/0201118 A1* | 8/2008 | Luo | 703/2 |
| 2008/0250388 A1* | 10/2008 | Meyer et al. | 717/106 |
| 2008/0301560 A1 | 12/2008 | Rogers et al. | |
| 2009/0019386 A1* | 1/2009 | Sweetland | G06F 17/248 715/765 |
| 2009/0144640 A1* | 6/2009 | Schneider et al. | 715/760 |
| 2009/0327301 A1* | 12/2009 | Lees et al. | 707/10 |
| 2010/0153490 A1 | 6/2010 | Durham | |
| 2010/0251143 A1 | 9/2010 | Thomas et al. | |
| 2010/0299591 A1 | 11/2010 | Suehiro et al. | |
| 2010/0325532 A1* | 12/2010 | Cohen | 715/234 |
| 2011/0083091 A1* | 4/2011 | Huin et al. | 715/771 |
| 2011/0145287 A1* | 6/2011 | Jiang et al. | 707/780 |
| 2011/0320191 A1* | 12/2011 | Makeyev | 704/9 |
| 2012/0016964 A1* | 1/2012 | Veen et al. | 709/219 |
| 2014/0026115 A1* | 1/2014 | Bank et al. | 717/113 |

OTHER PUBLICATIONS

International Search Report & Written Opinion, PCT/US2011/057285, dated Dec. 21, 2011, 10 pages.

TheFreeDictionary, "tangibly," retrieved Feb. 6, 2014, [online] http://www.thefreedictionary.com/tangibly 2 pages.

CSS Development: Fireburg, accessed online http://web.archive.org/web/20101018154633/http://getfireburg.com/css , Oct. 18, 2010, 4 pages.

European Office Action, European Patent Office, EP Application No. 11777016.4, mailed Apr. 17, 2014, 10 pages.

European Office Action, European Patent Office, EP Application No. 11777015.6, mailed Jun. 26, 2014, 9 pages.

Kumar, Syam R., "How to remove cruft from your apache log," Nov. 1, 2009, retrieved from the internet: http://www.webmasterview.com/2009/11/apache-log-cruft/ 3 pages.

Japanese Office Action, Japanese Patent Office, JP Application No. 2013-535117, issued Jun. 25, 2015, 16 pages.

Japanese Office Action, Japanese Patent Office, JP Application No. 2013-535116, issued Jun. 25, 2015, 18 pages

* cited by examiner

IDENTIFIERS FOR WEB FONT TEMPLATES

CLAIM OF PRIORITY

This application claims priority under 35 USC §119(e) to U.S. Patent Application Ser. No. 61/405,481, filed on Oct. 21, 2010, the entire contents of which are hereby incorporated by reference.

BACKGROUND

This description relates to creating and assigning identifiers to templates that define fonts for web assets.

In the ever-expanding connectivity provided by computer networks such as the Internet, computing devices may present various types of content such as text, graphics, audio, video, etc. Websites, web pages and the like created for individuals, groups, companies, etc. convey information by being accessed by end users. To produce such web assets, stylistic formats are defined along with the content to be presented. Through careful selection, such formats may convey information to the end user that is comparable to the information conveyed by the content itself.

SUMMARY

The systems and techniques described here relate to creating and assigning identifiers to templates that include style elements and corresponding web based fonts and properties.

In one aspect, a computer-implemented method includes producing a unique identifier, and, assigning the unique identifier to a style sheet for web asset production.

Implementations may include one or more of the following features. The computer-implemented may further include assigning another identifier to the style sheet, the other identifier may also being assigned to other style sheets. The other identifier may represent an application associated with multiple style sheets. The computer-implemented method may further include assigning another unique identifier to the style sheet. The style sheet may be a cascading style sheet. The computer-implemented method may further include, in response to a user request that identifies the assigned unique identifier, providing the style sheet to the user. Data that represents the providing of the style sheet to the user may be logged. The style sheet may include data that represents a series of style elements and properties of each style element included in the series of style elements. The style sheet may define a preliminary web asset.

In another aspect, a system includes a computing device that includes a memory configured to store instructions. The computing device also includes a processor to execute the instructions to perform a method that includes producing a unique identifier, and, assigning the unique identifier to a style sheet for web asset production.

Implementations may include one or more of the following features. The executed instructions may perform a method that includes assigning another identifier to the style sheet, the other identifier also being assigned to other style sheets. The other identifier may represent an application associated with multiple style sheets. The executed instructions may perform a method that includes assigning another unique identifier to the style sheet. The style sheet may be a cascading style sheet. The executed instructions may perform a method that includes, in response to a user request that identifies the assigned unique identifier, providing the style sheet to the user. Data that represents the providing of the style sheet to the user may be logged. The style sheet may include data that represents a series of style elements and properties of each style element included in the series of style elements. The style sheet may define a preliminary web asset.

In another aspect, a computer program product tangibly embodied in an information carrier and including instructions that when executed by a processor perform a method that includes producing a unique identifier, and, assigning the unique identifier to a style sheet for web asset production.

Implementations may include one or more of the following features. The computer program product may further include instructions that when executed by the processor perform a method that includes assigning another identifier to the style sheet, the other identifier also being assigned to other style sheets. The other identifier may represent an application associated with multiple style sheets. The computer program product may further include instructions that when executed by the processor perform a method that includes assigning another unique identifier to the style sheet. The style sheet may be a cascading style sheet. The computer program product may further include instructions that when executed by the processor perform a method that includes, in response to a user request that identifies the assigned unique identifier, providing the style sheet to the user. Data that represents the providing of the style sheet to the user may be logged. The style sheet may include data that represents a series of style elements and properties of each style element included in the series of style elements. The style sheet may define a preliminary web asset.

These and other aspects and features and various combinations of them may be expressed as methods, apparatus, systems, means for performing functions, program products, and in other ways.

DETAILED DESCRIPTION

Figure 1:
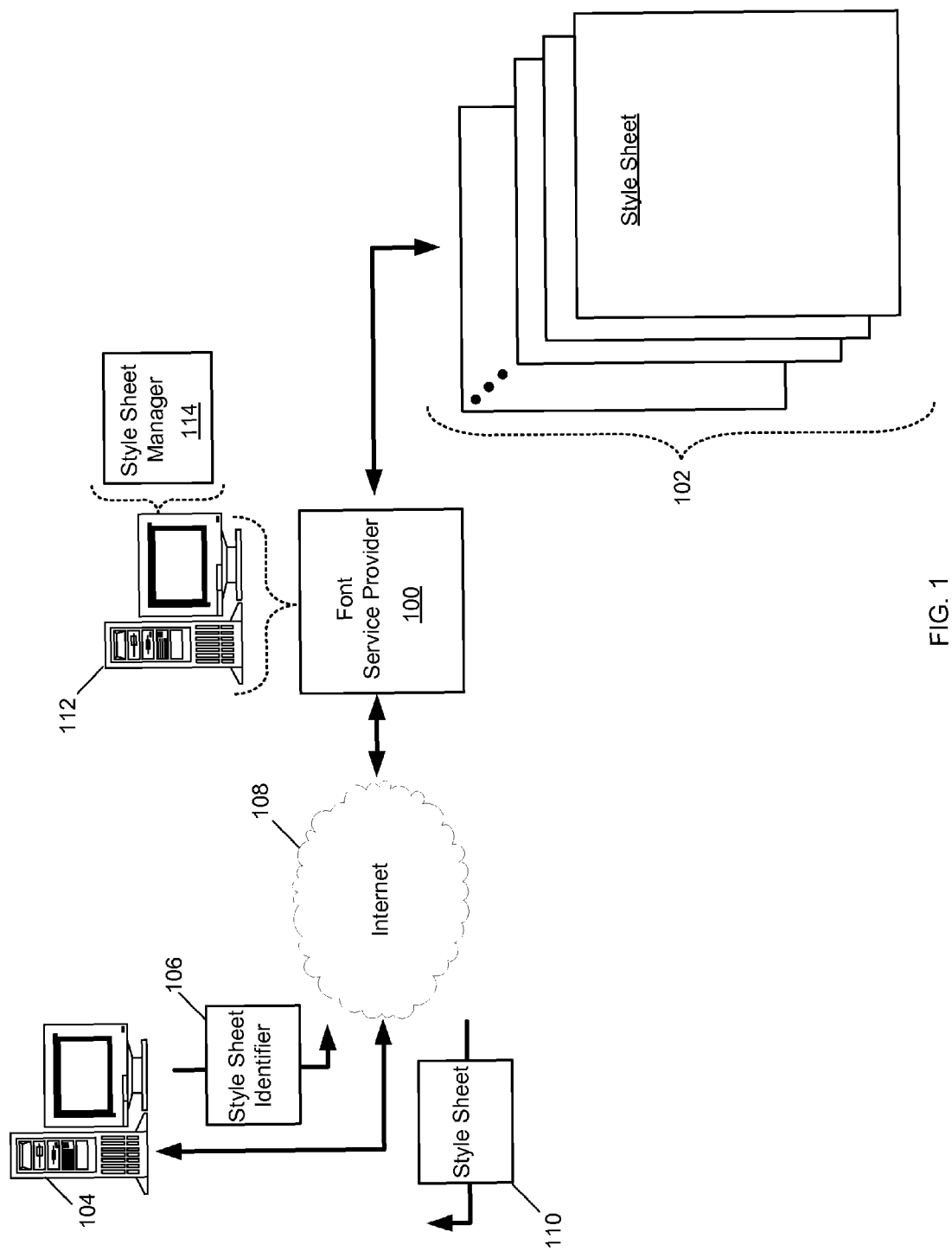
FIG. 1 illustrates an Internet-based font service provider routing style sheets.

Referring to FIG. 1, various types of fonts and associated stylistic properties (e.g., font size, color, etc.) may be selected and used in the production of web assets such as websites, web pages, etc. In creating such web assets, a number of font types are often selected along with similar or different style properties and incorporated into one or more files that define the content of the web asset and these stylistic aspects. One type of file, a style sheet (e.g., such as a cascading style sheet (CSS)), includes style rules that can be used by a browser to present a web asset such as a web page or a website. To provide this capability, style sheets may define style elements (e.g., headlines, body text, menus, headers, footers, etc.) and associated properties (e.g., font type, font size, font color, etc.) of a web asset (e.g., defined by an HTML document). In general, a style sheet can be considered as containing instructions that use a collection of keywords to specify the names of various style properties. The instructions of a style sheet can be considered a list of rules that include one or more selectors used to associate elements (e.g., a website headline) and style properties (e.g., font, font size, etc). Selectors may apply to one or more elements of a specific type, or only those elements that match a certain attribute. As such, by defining style elements such as selectors, properties of fonts and other textual elements may be defined and used in web asset production.

Determining which fonts and font properties provide a desirable viewing environment for an end user may be more based upon a designer's experience than by a set of predefined rules. As such, with years of experience, seasoned designers may identify collections of eye-catching fonts and properties for particular types of web assets and applications. For example, particular fonts with corresponding font sizes and colors may be conducive for presenting advertisements on web pages. Similarly, viewers may be more responsive to user interfaces that present particular fonts and font properties. As such, rather than repetitively identifying the fonts and font properties that work well together to provide web assets that resonate with end users, the collections of fonts and font properties could be identified and stored for use upon request. Further, by assigning an identifier to each collection, particular collections could be identified and retrieved in an efficient manner.

In this particular system arrangement, such collections of fonts and font properties are represented in style sheets stored in a repository that is managed by a font service provider 100. Along with providing fonts for use in web assets (e.g., websites, web pages, etc.), the font service provider also retains a knowledge base for providing font related information for various applications and scenarios. In this example, the font information resides in a collection of style sheets 102 that are individually accessible by the font service provider 100. For example, the collection 102 may be stored in one or more storage devices (e.g., hard drives, CD-ROMs, etc.) located local or remote from the font service provider 100. Further, for individual accessibility, each style sheet included in the collection 102 is assigned one or more unique identification labels. For example, a unique alpha-numerical identifier may be assigned to each style sheet by the font service provider 100 or by one or more other entities (individually or in combination). By providing the appropriate identifier to the font service provider 100, the corresponding style sheet is retrieved from the collection 102 and provided to the requester. For demonstrative purposes, in this arrangement, a computer system 104 provides a user access to the font provider service 100 for requesting one or more style sheets. To be provided the unique identifiers assigned to style sheets of interest, one or more techniques may be implemented. For example, upon accessing the font service provider 100 (e.g., by executing a web browser application), the computer system 104 may display a listing of selectable style sheet identifiers and corresponding uses (e.g., web page advertisements, user interfaces, home website for corporations, etc.). From this identifier listing, one or more selections may be made to identify style sheets interest. Users may also be made aware of identifiers through other means. For example, third party listings, catalogs, reviews and the like may provide an identifier source for potential users. Further, some identifiers may become well known over time through reuse for certain applications (e.g., certain types of advertisements, etc.). By becoming a pseudo-standard, users associated with a particular field may become familiar with identifiers of style sheets used again and again in their trade.

In this particular example, once identified, a style sheet identifier 106 is provided (e.g., in a message) to the font service provider 100 by way of the Internet 108 or one or more other types of communication networks (individually or in combination with the Internet 108). Upon receiving the style sheet identifier 106 (e.g., optionally with appropriate credentials for authorization), the font service provider 100 accesses the style sheet collection 102 and retrieves the appropriate style sheet (or multiple sheets). After performing appropriate operations (e.g., confirming the style sheet identifier, logging the transaction, etc.), in this example, a corresponding style sheet 110 is provided to the computer system 104 for use in one or more user directed applications. To produce and manage the style sheet collection along with producing and managing the style sheet identifiers, a computer system 112 located at the font service provider 100 executes a style sheet manager 114. While a single computing device (e.g., the computer system 112) is employed for style sheet management in this arrangement, various types of computation architectures and environments may be implemented. For example, one or more distributed computer architectures may be implemented. Along with producing and managing style sheets, processes executed at the font service provider 100 (e.g., by the computer system 112) may provide other functionality. For example, a user may access the font service provider 100 to define and create web assets (e.g., a website, webpage, etc.) by using information residing at the font service provider. For example, preliminary web assets (e.g., "mockups" of web assets) may be created from style sheets and content of style sheets stored at or attained by the font service provider 100. By creating, selecting, reviewing, etc. style sheet elements, one or more style sheets may be produced by the user (prior to being requested and received from the font service provider 100). Along with producing the style sheets, the font service provider 100 (e.g., through operations executed by the style sheet manager 114) may appropriately produce and assign identifiers to the produced style sheets. Further the style sheets may be stored (and cataloged) at the font service provider 100 for later user by the user or other individual that access the font service provider.

Figure 2:
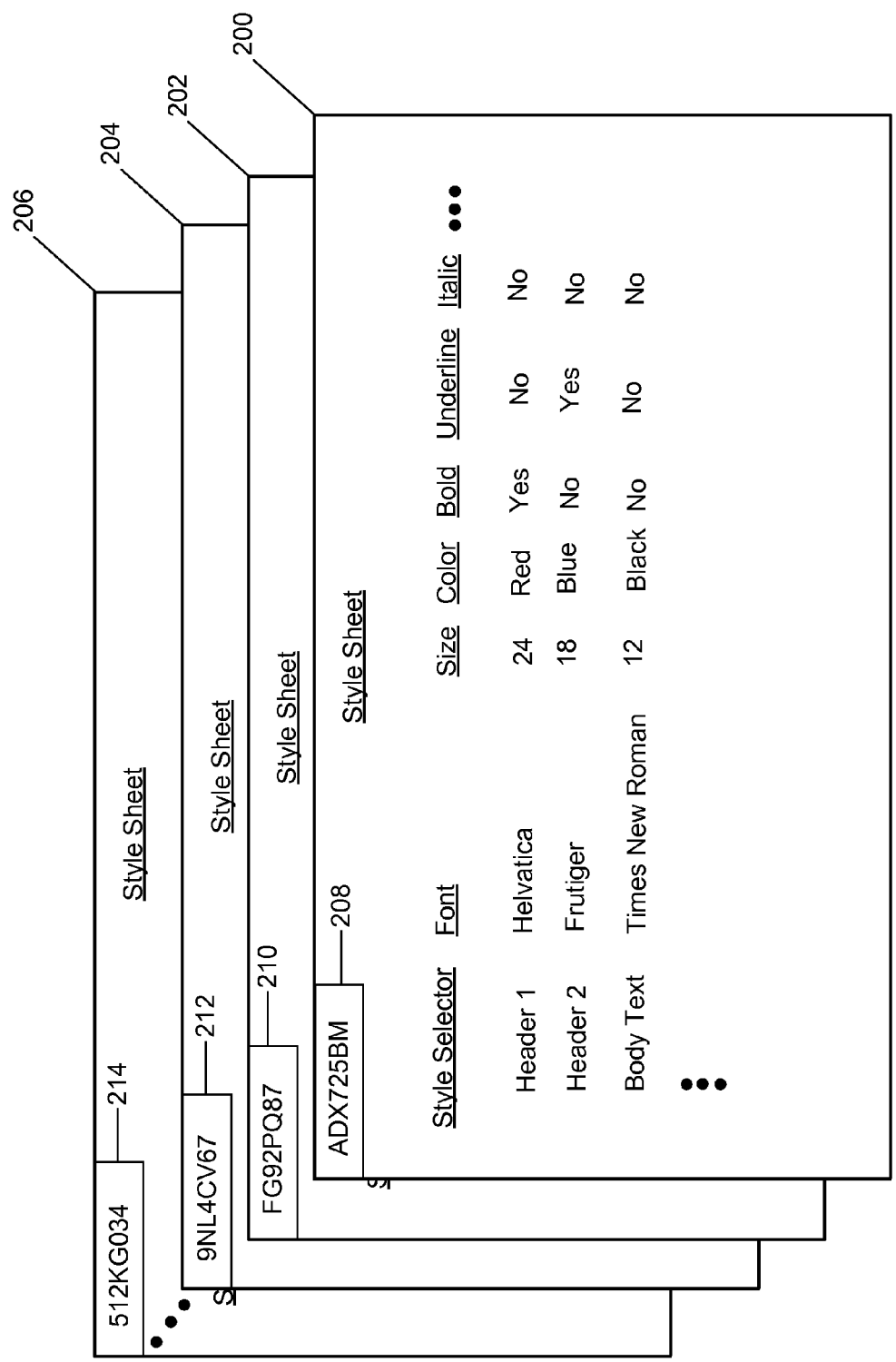
FIG. 2 illustrates uniquely identified style sheets.

Referring to FIG. 2, an exemplary collection of style sheets (e.g., similar to the sheets of collection 102) is presented along with representative information that may be included in each sheet. In this example, each of the style sheets (e.g., cascading style sheets) represents a series of style elements and corresponding properties. In particular, as viewable on style sheet 200, three elements (e.g., headline 1, headline 2, body text) are listed along with corresponding properties represented by defined terms (e.g., font, size and color) and Boolean values to indicate if a corresponding property (e.g., bold, underline, italic) is active or inactive. Each of the style sheets 200, 202, 204, 206 also includes a respective unique identifier 208, 210, 212, 214 assigned by a font service provider or other entity. In this particular example, each unique identifier includes eight alpha-numerical characters, however, more or less characters may be employed. One or more other techniques may be implemented for defining such unique identifiers to each style sheet. Random number generators and other numerical techniques may be implemented for producing identifiers. In some arrangements, while one portion of the identifier may be unique for each style sheet, another portion of the identifier may be commonly shared among sheets and provide descriptive language that may be recognizable to a user. Terms associated with applications (e.g., "web page advertisement", "company website", etc.), genres (e.g., web page for catalog listings, web page for newspaper, etc.), etc. may be used in combination with the unique portion for each style sheet. Various file structures, hierarchies and other data storage management techniques may also be implemented for efficient storage, sorting and retrieval of style sheets.

Figure 3:
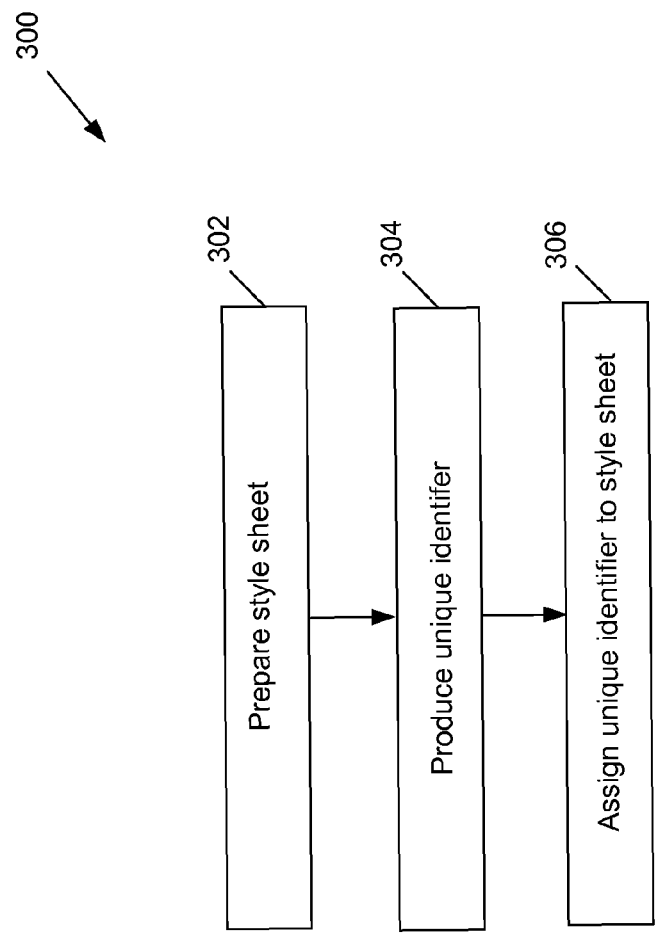
FIG. 3 is an example flow chart of operations for assigning and using style sheet identifiers.

Referring to FIG. 3, a flowchart 300 represents operations provided by a font service provider such as operations to create and manage collections of style sheets. Operations associated with creating and managing style sheets are typically executed by a single computing device (e.g., a server used by a font service provider), however, operations may be executed by multiple computing devices. Along with being executed at a single site (e.g., at one computing site of a font service provider), operation execution may be distributed among two or more locations.

Operations may include preparing 302 a style sheet for a particular application (e.g., web page advertisement) that may be of interest to a user (e.g., a web asset designer). The style sheet may include style elements (e.g., selectors) and properties (e.g., font, font size, font color, etc.) to provide a particular appearance of a web asset. Operations may also include producing 304 a unique identifier for the style sheet. For example, the identifier may include a unique portion (e.g., a unique alpha-numerical term for various length) and a descriptive portion (e.g., to identify an application, genre, etc.). Upon attaining the unique identifier, operations may include assigning 306 the identifier to the style sheet so that the sheet is uniquely identifiable for storing, retrieving and using to produce web assets.

Figure 4:
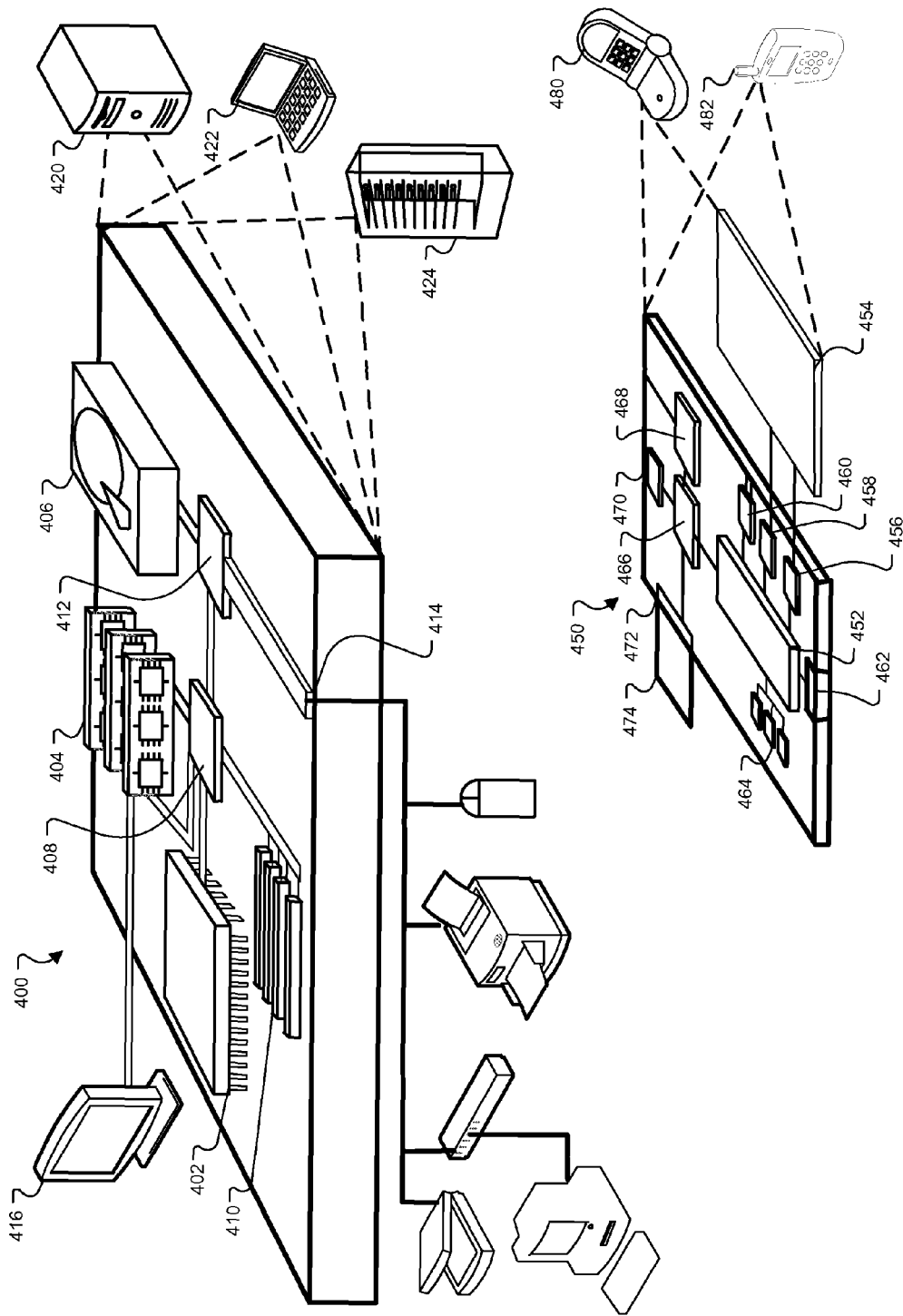
FIG. 4 illustrates components of computing devices.

FIG. 4 shows an example of example computer device 400 and example mobile computer device 450 that can be used to implement the techniques described herein. For example, a portion or all of the operations of a font service provider, e.g., to create and assign identifiers to style sheets (along with manage accessing of the sheets), may be executed by the computer device 400 and/or by the mobile computer device 450. Computing device 400 and/or mobile computing device 450 may be used by another entity (e.g., a holding company) separately or in combination with a font service provider. Computing device 400 is intended to represent various forms of digital computers, including, e.g., laptops, desktops, workstations, personal digital assistants, servers, blade servers, mainframes, and other appropriate computers. Computing device 450 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, including, e.g., display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units. Memory 404 also can be another form of computer-readable medium, including, e.g., a magnetic or optical disk.

Storage device 406 is capable of providing mass storage for computing device 400. In one implementation, storage device 406 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer including, e.g., laptop computer 422. In some examples, components from computing device 400 can be combined with other components in a mobile device (not shown), including, e.g., device 450. Each of such devices can contain one or more of computing device 400, 450, and an entire system can be made up of multiple computing devices 400, 450 communicating with each other.

Computing device 450 includes processor 452, memory 464, an input/output device including, e.g., display 454, communication interface 466, and transceiver 468, among other components. Device 450 also can be provided with a storage device, including, e.g., a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, including, e.g., control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can also include secure data. Thus, for example, expansion memory 474 can be provided as a security module for device 450, and can be programmed with instructions that permit secure use of device 450. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 464, expansion memory 474, and/or memory on processor 452 that can be received, for example, over transceiver 468 or external interface 462.

Device 450 can communicate wirelessly through the communication interface 466, which can include digital signal processing circuitry where necessary, or where desired. Communication interface 466 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, including, e.g., using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, including, e.g., through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include: a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

Processes described herein and variations thereof (referred to as "the processes") include functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

A number of implementations have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

What is claimed is:

1. A computer-implemented method comprising:
   in response to a user request that identifies one of a plurality of produced unique identifiers, providing one style sheet from a collection of style sheets, wherein the provided style sheet is exclusively assigned the one unique identifier, wherein the one unique identifier includes a portion that is shared among other unique identifiers assigned to other style sheets and that describes a commonality of web assets producible by applying one or more of the style sheets whose assigned unique identifier includes the shared portion, each style sheet is a cascading style sheet and includes data that represents a series of style elements and properties of each style element included in the series of style elements; and
   logging data that represents the providing of the one style sheet from the collection of style sheets, wherein logging data includes confirming the identifier of the style sheet of the collection of style sheets.

2. The computer-implemented method of claim 1, wherein the style sheet defines a preliminary web asset.

3. The computer-implemented method of claim 1, wherein the collection of style sheets is stored at a font service provider.

4. The computer-implemented method of claim 1, wherein the style sheet defines a preliminary web asset.

5. The computer-implemented method of claim 1, wherein the portion of the unique identifier that is shared among other style sheets includes descriptive language recognizable to a user.

6. A system comprising:
   a computing device comprising:
      a memory configured to store instructions; and
      a processor to execute the instructions to perform operations comprising:
         producing a unique identifier; and
         exclusively assigning the unique identifier to a cascading style sheet for web asset production, wherein the unique identifier includes a portion that is shared among other unique identifiers assigned to other cascading style sheets and that describes a commonality of web assets producible by applying one or more of the cascading style sheets whose assigned unique identifier includes the shared portion, the cascading style sheet includes data that represents a series of style elements and properties of each style element included in the series of style elements;
         in response to a user request that identifies the produced unique identifier, providing the cascading style sheet from a collection of cascading style sheets; and
         logging data that represents the providing of the cascading style sheet from the collection of cascading style sheets, wherein logging data includes confirming the identifier of the cascading style sheet of the collection of cascading style sheets.

7. The system of claim 6, wherein the style sheet defines a preliminary web asset.

8. The system of claim 6, wherein the collection of cascading style sheets is stored at a font service provider.

9. The system of claim 6, wherein the portion of the unique identifier that is shared among other cascading style sheets includes descriptive language recognizable to a user.

10. The system of claim 6, wherein the cascading style sheet defines a preliminary web asset.

11. A computer program product tangibly embodied in an information carrier and comprising instructions that when executed by a processor perform operations comprising:
   in response to a user request that identifies one of a plurality of produced unique identifiers, providing one style sheet from a collection of style sheets, wherein the provided style sheet is exclusively assigned the one unique identifier, wherein the one unique identifier includes a portion that is shared among other unique identifiers assigned to other style sheets and that describes a commonality of web assets producible by applying one or more of the style sheets whose assigned unique identifier includes the shared portion, each style sheet is a cascading style sheet and includes data that represents a series of style elements and properties of each style element included in the series of style elements; and
   logging data that represents the providing of the one style sheet from the collection of style sheets, wherein logging data includes confirming the identifier of the style sheet of the collection of style sheets.

12. The computer program product of claim 11, wherein the style sheet defines a preliminary web asset.

13. The computer program product of claim 11, wherein the collection of style sheets is stored at a font service provider.

14. The computer program product of claim 11, wherein the portion of the unique identifier that is shared among other cascading style sheets includes descriptive language recognizable to a user.

* * * * *